United States Patent
Celadnik et al.

(10) Patent No.: US 8,051,407 B2
(45) Date of Patent: Nov. 1, 2011

(54) METHOD FOR CONTROLLING A SOFTWARE MAINTENANCE PROCESS IN A SOFTWARE SYSTEM LANDSCAPE AND COMPUTER SYSTEM

(75) Inventors: Werner Celadnik, Kornwestheim (DE); Michael Dohle, Berlin (DE); Karlheinz Lier, Rauenberg (DE); Volker Schulz, Heppenheim (DE)

(73) Assignee: SAP AG, Walldorf (DE)

( * ) Notice: Subject to any disclaimer, the term of this patent is extended or adjusted under 35 U.S.C. 154(b) by 1317 days.

(21) Appl. No.: 11/347,070

(22) Filed: Feb. 3, 2006

(65) Prior Publication Data
US 2006/0174241 A1 Aug. 3, 2006

(30) Foreign Application Priority Data
Feb. 3, 2005 (EP) .................................. 050002249

(51) Int. Cl.
*G06F 9/44* (2006.01)
(52) U.S. Cl. ...................................................... 717/121
(58) Field of Classification Search .......... 717/101–102, 717/121–126, 107; 705/7–9; 707/203; 709/223; 715/234, 513; 713/201
See application file for complete search history.

(56) References Cited

U.S. PATENT DOCUMENTS

| 5,295,242 A | 3/1994 | Mashruwala et al. |
| 5,524,246 A | 6/1996 | Hurley et al. |
| 5,664,133 A | 9/1997 | Malamud et al. |
| 5,729,746 A | 3/1998 | Leonard |
| 5,903,478 A | 5/1999 | Fintel et al. |
| 5,907,705 A * | 5/1999 | Carter ........................... 717/122 |
| 6,256,773 B1 * | 7/2001 | Bowman-Amuah .......... 717/121 |
| 6,745,382 B1 | 6/2004 | Zothner |
| 7,010,780 B2 * | 3/2006 | Perycz et al. .................. 717/107 |
| 7,020,697 B1 * | 3/2006 | Goodman et al. ............. 709/223 |
| 7,035,809 B2 * | 4/2006 | Miller et al. ........................ 705/8 |
| 7,103,871 B1 * | 9/2006 | Kirkpatrick et al. .......... 717/102 |
| 7,234,131 B1 * | 6/2007 | Speyrer et al. ................. 717/101 |
| 7,337,124 B2 * | 2/2008 | Corral ................................ 705/9 |
| 7,596,778 B2 * | 9/2009 | Kolawa et al. ................. 717/126 |
| 2004/0030992 A1 * | 2/2004 | Moisa et al. ................... 715/513 |
| 2005/0086531 A1 * | 4/2005 | Kenrich ......................... 713/201 |
| 2005/0114829 A1 * | 5/2005 | Robin et al. ................... 717/101 |
| 2006/0161879 A1 * | 7/2006 | Lubrecht et al. .............. 717/101 |

FOREIGN PATENT DOCUMENTS
EP 0592046 A 4/1994
(Continued)

OTHER PUBLICATIONS
Office Action—05 002 249.0-2211 Jul. 24, 2006 EP Office Action, 6 pgs.
(Continued)

*Primary Examiner* — Tuan Anh Vu
(74) *Attorney, Agent, or Firm* — Schwegman, Lundberg & Woessner, P.A.

(57) ABSTRACT

A method for controlling a software maintenance process in a software system landscape has a plurality of logical systems, wherein independent service software components are executed in a central control system and used to perform actions of the software maintenance process for servicing the logical systems. The service software components communicate with a phase controller that coordinates the software service components and allows and denies actions based on a phase of the software maintenance process and on phase definitions comprising allowed and/or barred actions.

21 Claims, 2 Drawing Sheets

FOREIGN PATENT DOCUMENTS

| | | |
|---|---|---|
| EP | 0840212 | 5/1998 |
| WO | WO-91/02304 A | 2/1991 |
| WO | WO-01/86477 A2 | 11/2001 |

OTHER PUBLICATIONS

"Search Report for European Application No. EP 05 00 2249", (Jun. 2, 2005),4 pgs.

Hartmann, Gerd, et al., "MySAP Product Lifecycle Management", http://www.sap-press.de, and Ulrich Schmidt Galileo Press,(2004),36 pgs.

Liane,Will, "SAP R/3 Systemadministration", XP-002329334, Galileo Press GMBH Bonn, No English Translation,(2000),34 pgs.

McFarland Metzger, Sue S., "SAP R/3 change and transport management : the official SAP guide / (SAP R/3—Systemlandschaft Implementieren und warten)", XP-002325774, (Jan. 12, 2000),419, 461, 465.

SAP AG, "The SAP Magazine/SAP Info 101", *ISSN 1619-6775*, Barbara Doerr pp. 8-9,(Dec. 2002, Jan. 2003),40 pgs.

Schneider-Neureither, Andreas (., "SAP System Landscape Optimization", *SAP Press*, 2004, ISBN 1-59229-026-4, (2004),73-78; 96-100.

Van Der Hoek, A, et al., "Software Release Managemet foRComponent-Based Software", *In Software Practice & Experience*, 33(33), (Jan. 2003),81-97.

\* cited by examiner

METHOD FOR CONTROLLING A SOFTWARE MAINTENANCE PROCESS IN A SOFTWARE SYSTEM LANDSCAPE AND COMPUTER SYSTEM

CLAIM OF PRIORITY

The present patent application claims the priority benefit of the filing date of European Application (EPO) No. 05002249.0 filed Feb. 3, 2005, the entire content of which is incorporated herein by reference.

TECHNICAL FIELD

This disclosure relates to a method for controlling a software maintenance process in a software system landscape and to a computer system, respectively.

DESCRIPTION OF THE RELATED ART

Complex software like applicant's SAP R/3 Release 4.5 (SAP) requires customization, e.g. selection of predefined functionality, and adaptation, e.g. addition of or amendment to functionality, as well as other servicing like program and data updates, cf. "SAP System Landscape Optimization" by A. Schneider-Neureither (Ed.), SAP Press, 2004, ISBN 1-59229-026-4, and "SAP R/3 Änderungs-und Transportmanagement" by Metzger and Röhrs, Galileo Press GmbH, Bonn, Germany, $4^{th}$ reprint 2004, ISBN 3-934358-42-X.

In order to avoid disruptions of the productive system running the software due to such servicing, such complex software may be implemented in form of separate logical systems that together form a system landscape. A typical implementation of the aforementioned SAP software for instance may, cf. FIG. 1, comprise a development system 101 for customizing and development work, a quality assurance system 102 for testing functionality using representative test data, a training system 103 for training new users, and several productive systems 104, e.g. each for a different factory, for actual productive use. Other or additional users and systems may be defined according to the particular requirements.

The logical systems are identical in large parts, function autonomously and may be run on a single computer. The quality assurance system 102 for example resembles the productive system 104 in that it provides all the functionality, its present data and additionally special test data. New customization settings or adaptations may thus be thoroughly tested in the quality assurance system 102 without jeopardizing the productive system 104. Likewise, the training system 103 resembles the productive system 104 in that it provides some of the functionality and special test data. A new user using the training system 103 may thus become accustomed to the functionality and observe the effect of his actions, albeit without disturbing the productive system 104.

Software services are usually first effected in systems like the development system 101 and the quality assurance system 102, e.g. in systems that are not productive. Once the services have been approved, they may be transported to the productive systems 104. Such transport of software services between the systems 101, . . . , 104 of the system landscape 100 is effected using a transport management system. The transport management system logically connects the logical systems 101, . . . , 104 and serves to transport software services via logical transport paths 105. A service may for example be approved in the development system 101 for export. It will then be forwarded to an import buffer of the quality assurance system 102. Import into the quality assurance system 102 is approved manually by an operator. Once the service has been imported into the quality assurance system 102, it may be forwarded to an import buffer of the training system 103 and the productive systems 104 where it will be imported following manual approval by an operator.

Servicing of such a system landscape is a complex task. It requires generation of transport requests for software services and approval of an import of the transport requests into the respective systems by operators who are authorized for the respective systems. This requires an analysis of the system landscape layout, of the route that each service takes through the system landscape, of project status switches in each system that define the respective system's changeability options, of attributes in each service that define properties of the service etc. Import of services and other tasks are performed based on this analysis.

Additionally, consideration has to be given to the time frame for the services. Typically, services are not transported separately into productive systems at the time they become available but bundled together with other services at predetermined times. However, transports into systems other than productive systems, e.g. into test systems, may be effected outside the predetermined times. Also, certain services like hot fixes require immediate transport in order to assure continued functionality of the productive system in case of software malfunctions.

The operators are therefore assisted in the servicing by a number of separate software components that are executed in a central control system, or in different control systems that are connected for data transfer therebetween.

An SMI project, e.g. an electronic file in SAP's Solution Manager for Implementation (SMI), defines a desired section of the system landscape for servicing. A description of SAP's SMI is e.g. given in "SAP Service und Support" by Gerhard Oswald, Galileo Press, 2004, ISBN 3898425746. The actual routes taken by the transport requests in this section are determined by the available transport paths through the system landscape considering e.g. attributes of the transport requests like type of service, target system and project data, and e.g. status switches in each system like changeability options on project basis etc.

A Schedule Manager, e.g. as described in Barbara Doerr: Fast Close—Geschwindigkeit und Transparenz im Abschluss, in Karlheinz Küting, Nobert Pfitzer, Claus-Peter Weber (Hrsg.): Herausforderungen und Chancen durch weltweite Rechnungslegungsstandards—Kapitalmarktorientierte Rechnungslegung und integrierte Unternehmenssteuerung, Schäffer-Poeschel, Stuttgart, 2004, ISBN 3791023446, defines task lists that are executed in a central system to control the software service process in the affected systems. The task lists comprise tasks like generate, approve and import a transport request. The operators effect the tasks of the task lists manually.

A Service Desk, e.g. as described in www.itil.org or "SAP Service und Support" by Gerhard Oswald, Galileo Press, 2004, ISBN 3898425746, may be provided to generate change requests, e.g. for urgent corrections like hot fixes, for regular corrections, for development work etc. The change requests are then available electronically in the software system. There is an approval step where a change manager or an advisory board decides on whether a change should be applied or not. Based on approved change requests, the tasks of the Schedule Manager may be executed by developers and IT service engineers. Especially for these user roles workflow inboxes and user interfaces are provided by the Service Desk.

A Project Management System like SAP's cProjects, e.g. as described in "mySAP Product Lifecycle Management" by

*Gerd Hartmann, Ulrich Schmidt*, SAP PRESS, 2004, ISBN 3-89842-372-7, may be provided to register data regarding planned software services and data regarding the status of the software maintenance process. The process organization, process flow, an overview of the process, billing data for business management controlling etc. may be generated based on these data.

Each of the software components like the SMI, the Schedule Manager, the Service Desk, the Project Management System etc. relies on data of another component, and processes the data further, or otherwise changes data that at least one other component relies upon. For example, in response to a generation of a transport request in the Service Desk, the Schedule Manager generates a task list for that request. This task list depends on details of the transport request and on the SMI project. The Project Management System relies on the task lists of the Schedule Manager. Whenever a task of the task list is completed, e.g. upon import of a transport request into a particular software system, the task list needs to be updated and the project management system needs to be informed. Furthermore, dependencies between tasks of different tasks lists may be present, e.g. if software services need to be performed in a particular order. If urgent software services are performed, the tasks and task lists change.

There are thus a number of dependencies that need to be considered by the operators who use the software components.

In view of the fact that an SAP R/3 implementation may comprise dozens of systems and require thousands of services per month during phases of change, the operator time required to analyze and consider the dependencies becomes considerable as does the risk for errors to occur.

BRIEF DESCRIPTION OF THE DRAWINGS

Further embodiments of the invention are inferable from the following description and the claims.

DETAILED DESCRIPTION

According thereto, a method for controlling a software maintenance process in a software system landscape having a plurality of logical systems, and a computer system are provided, and a phase controller coordinates software service components and allows and denies actions based on a phase of the software maintenance process and on phase definitions comprising allowed and/or barred actions. The phase controller thus provides a centralized coordination of the software components that are used to assist a software maintenance process, so that the complexity of software maintenance is considerably reduced. The risk for operator errors to occur is also considerably reduced because the phase controller prevents actions at stages where these actions could interfere with the orderly execution of the maintenance process.

Figure 1:
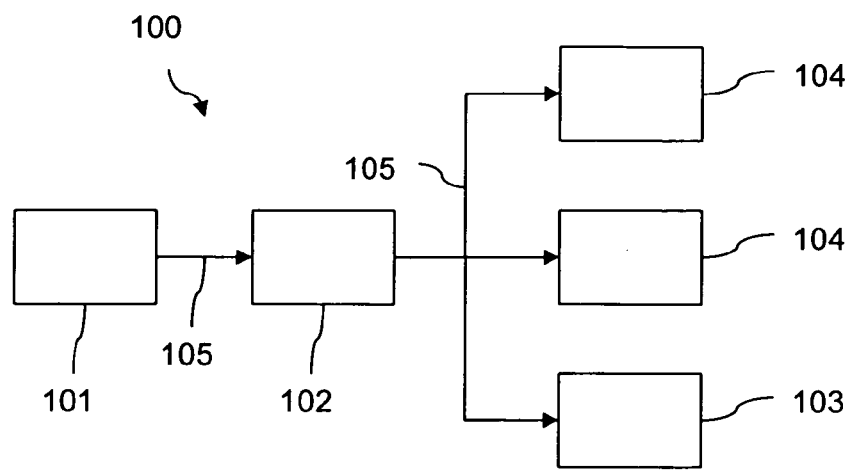
FIG. 1 shows a system landscape of the prior art.
Figure 2:
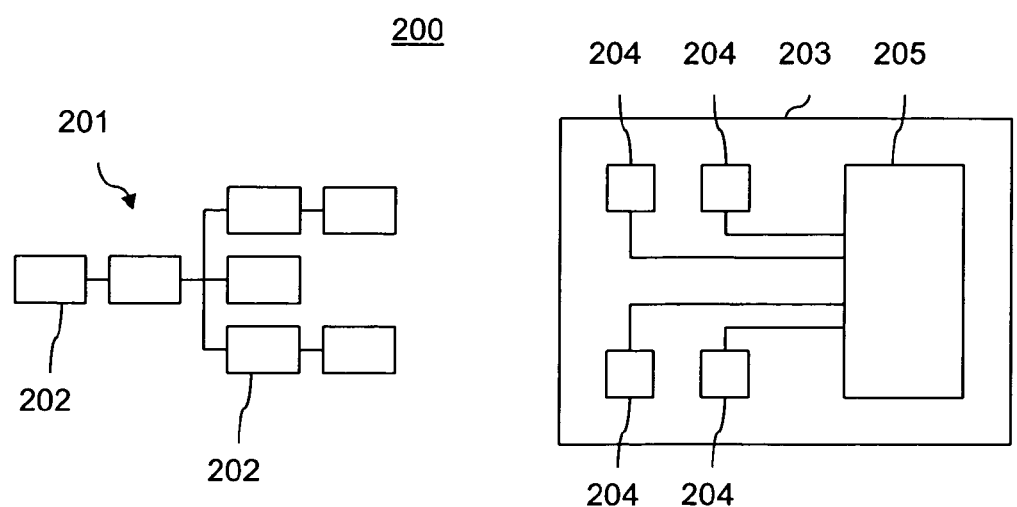
FIG. 2 illustrates a computer system.

The computer system 200 shown in FIG. 2 comprises a system landscape 201 having logical systems 202 like in the system landscape of FIG. 1 and a central control system 203. The central control system 203 comprises service software components 204 for servicing the logical systems 202 and a phase controller 205 that coordinates the service software components 204.

The service software components 204, in one example embodiment, comprise a Solution Manager for Implementation, a Schedule Manager, a Service Desk and/or a Project Management System. Each service software component 204 is designed to register itself with the phase controller 205. Registration is, in one example embodiment, performed using an identification. Additionally, further information may be transmitted to the phase controller 205, e.g. configuration data of the service software component, data regarding software service processes, program methods and the like.

The phase controller 205 and the service software components 204 run in the central logical control system 203. They may, however, also run on different logical control systems. The logical control system(s) and the logical systems 202 may be executed on one computer or on physically separated computers as known in the art.

Figure 3:
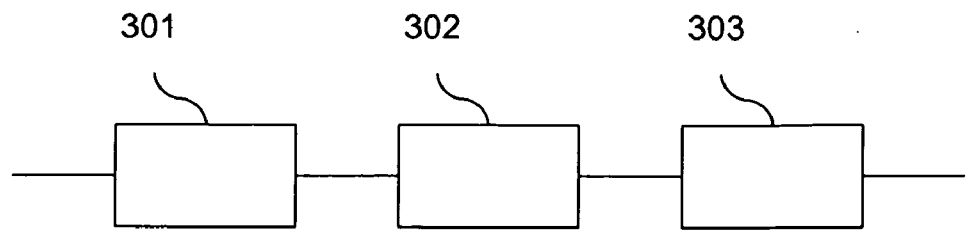
FIG. 3 illustrates software maintenance cycles.

Software servicing is performed in software maintenance cycles 301, 302, 303, cf. FIG. 3. The software maintenance cycles 301, 302, 303 are usually periodic cycles, e.g. on a monthly basis, and are executed sequentially.

Figure 4:
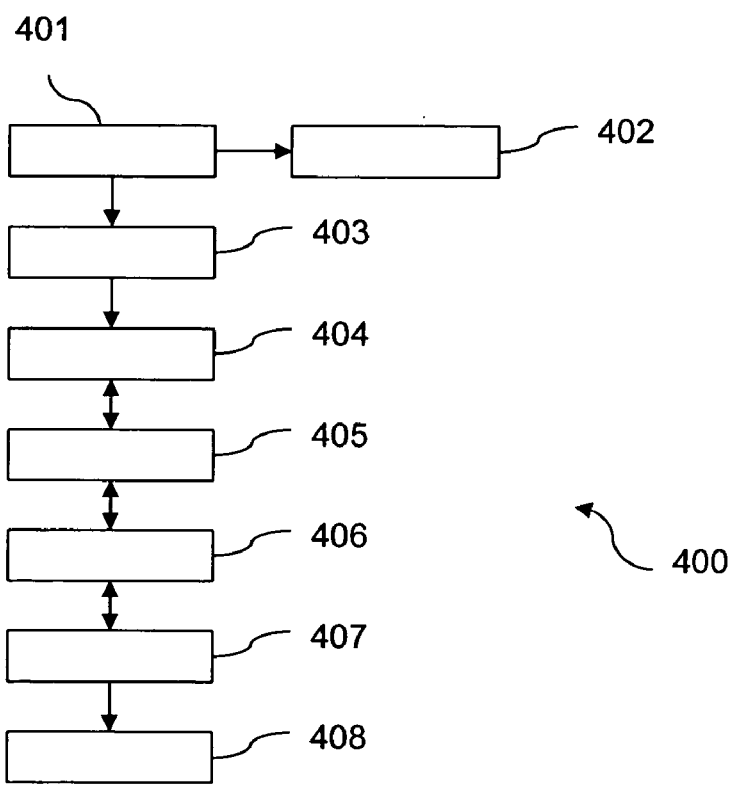
FIG. 4 illustrates phases of a software service cycle.

Each software maintenance cycle 301, 302, 303 is divided into phases. The phases are executed sequentially during each software maintenance cycle. An example phase model 400 is shown in FIG. 4 and comprises a generation phase 401, a cancellation phase 402, a development phase 403 without approval, a development phase 404, a test phase 405, an urgent correction phase 406, a go-life phase 407, and/or a finalization phase 408. The phase controller 205, in one example embodiment, provides a number of predefined phase models as well as full adaptability, e.g. addition or deletion or redefinition of phases, e.g. by means of customization settings.

Each phase 401, . . . , 408 generally defines actions that may be performed, actions that need to be performed and/or actions that may not be performed. For example, the generation of transport requests is typical for the development phase 404, the test phase 405 and the urgent correction phase 406, whereas in the finalization phase 407, transport requests may no longer be generated. The generally described actions are performed by the service software components 204. The phases may for example be defined as follows.

The generation phase 401 is, in one example embodiment, initiated by the Project Management System, or by the Service Desk, initiates a software service cycle and defines:
  positions for changes like corrections and urgent corrections may be generated and approved
  the changes may, however, not yet be effected in the systems
  no task list is required, but if a task list exists, it may not comprise tasks that contradict the phase "Generation Phase"

A change from the generation phase 401 to the cancellation phase 402 is possible as no changes have been performed in the systems 202 at this stage. The software service cycle is terminated with the cancellation phase 402.

The development phase 403 without approval defines:
  changes may be effected, e.g. transport requests and tasks may be generated
  if there are change positions due to changes that have not been effected in the previous service cycle, lists thereof may be generated
  positions for changes like corrections and urgent corrections may be approved
  the changes may, however, not yet be effected In the development phase 404, the changes may be effected, e.g. transport requests may be imported from the buffers into the respective systems.

The test phase 405 defines:
  changes may be effected, e.g. transport requests and tasks may be generated
  approval of transport requests for import into systems 202 is possible
  transports are planned and/or performed
  test data and test notifications may be generated
  urgent and normal corrections are allowed The urgent correction phase 406 defines:
  changes may be effected, e.g. transport requests and tasks may be generated, however, only on a restricted basis, e.g. by a quality assurance team, in order to finalize corrections
  approval of transport requests for import into systems 202 is possible in order to finalize corrections
  positions for changes like corrections and urgent corrections may no longer be approved
  no new test data and test notifications may be generated The Go-Life Phase 407 defines:
  the buffers of the productive systems are imported into the productive systems
  no change positions remain
  the next service cycle may be activated The finalization phase 408 aims to finalize the service cycle with all its tasks:
  approval of transport requests is no longer allowed
  transports are no longer allowed
  all buffers, including the buffers of the productive system(s), become empty
  change positions that are still open need to be cancelled or transferred to the following service cycle
  the service cycle is completed In order to ensure that all change positions are completed, the change between the go-life phase 407 and the finalization phase 408 involves an analysis of all open positions. Positions may remain open because requests have not been exported, e.g. because it has not been possible to do so in a given period of time, because of critical requests that still remain in the import buffers and block subsequent requests, or the like. Requests that have not been approved at this stage may be taken over into the next service cycle. Requests that have been approved at this stage may either be imported with the complete buffer or deleted from the buffer.

The phase model of each of the service software components 204 may comprise fewer, more and/or different phases than the phases in the controller 205. In this case, a mapping between the phase model of the service software component to the phase model of the phase controller 205 is provided and, in one example embodiment, is stored in the phase controller 205.

The phase controller 205 coordinates the execution of the software servicing process of the software maintenance cycles 301, 302, 303 and the phases 401, . . . , 408 using the above described or other phases.

If a service software component 204 intends to perform an action, it inquires at the phase controller 205 whether that action is allowed in the current phase. If, for instance, a task in a task list in the schedule manager requires generation of a transport request, the schedule manager inquires at the phase controller 205 whether the transport request may be generated. The phase controller 205 will allow the generation if the current phase is e.g. the development phase 404 and will deny the generation if the current phase is e.g. the finalization phase 408.

Further, if one of the service software components 204 intends to initiate a change of phase, e.g. into the finalization phase 408, it sends a corresponding request to the phase controller 205. The phase controller 205 requests all service software components 204 to indicate whether the intended change of phase is possible from their point of view. If all service software components 204 indicate that this is possible, the change of phase is effected by sending to all service software components 204 a request to proceed to the next phase. If, on the other hand, one of the service software components 204 has not yet completed a task belonging to, e.g., the development phase 404, it may send a veto. The requested change of phase is then denied.

In one example embodiment, the check whether an intended action or change of phase is possible, as well as the actual change, are effected by means of a method that is placed in the phase controller 205 upon initial registration of a particular service software component. Each service software component may thus have a customized method stored centrally in the phase controller 205 and initiated centrally by the phase controller 205. The method describes actions to be taken and may comprise a table or a program subroutine or the like.

Although the foregoing has been a description of a example embodiment of the invention, it will be apparent to those skilled in the art upon review of this disclosure that numerous variations and modifications may be made in the invention. For example, instead of using SAP R/3 Release 4.5, other SAP and non-SAP systems may benefit from the invention.

What is claimed is:

1. A method of controlling a software maintenance process in a software system landscape having a plurality of logical systems, the method comprising:
  determining a current phase of the software maintenance process, each phase of the software maintenance process defining actions allowed, required, or not allowed to be performed;
  receiving, at a phase controller, a request generated by and received from an independent service software component of a plurality of independent service software components requesting allowance to perform an action, the plurality of independent service software components to perform actions of the software maintenance process for servicing the logical systems;
  storing a customized algorithm for each of the independent service software components at the phase controller upon initial registration of each of the independent service software components with the phase controller, the customized algorithm used in automatically determining whether an intended action is allowed by describing actions to be taken for each of the independent service software components;
  automatically and without human intervention, determining, using the phase controller and the customized algorithm stored at the phase controller for the independent service software component, whether to allow the action based on the current phase of the software maintenance process and on phase definitions of the current phase comprising allowed or barred actions; and
  allowing or denying the action based on the determining performed by the phase controller.

2. The method of claim 1, wherein the actions comprise a selection from a group consisting of generating a transport request, transporting the transport request, importing a software service into the logical systems, generating test data, and generating a test message.

3. The method of claim 1, further comprising using a phase model to divide the software maintenance process into phases, the phase model comprising one or more of a generation phase, a cancellation phase, a development phase without approval, a development phase, a test phase, an urgent correction phase, a go-life phase, or a finalization phase.

4. The method of claim 3, further comprising:
   determining if a phase model of a service software component is different than a phase model of the phase controller; and
   based on the determining, mapping the phase model of the service software component to the phase model of the phase controller.

5. The method of claim 1, further comprising initiating a change from one phase to another phase.

6. The method of claim 1, further comprising sending an inquiry to each of the other independent service software components of the plurality of service software components, the inquiry requesting each of the other independent service software components to indicate whether a change from one phase to another phase is possible from a point of view of each of the other independent service software components.

7. The method of claim 6, further comprising allowing the phase change based on the plurality of the independent service software components indicating that the phase change is possible.

8. The method of claim 7, wherein the allowing comprises sending a request to each of the plurality of independent service software component to proceed to a next phase.

9. The method of claim 6, further comprising denying the phase change based on at least one of the plurality of the independent service software components indicating a veto.

10. The method of claim 9, wherein the veto is based on a non-completion of a task belonging to the current phase.

11. The method of claim 1, further comprising requesting a change from one phase to another phase at the phase controller.

12. The method of claim 1, further comprising notifying the plurality of service software components about a phase change.

13. The method of claim 1, further comprising structuring the software maintenance process in software service cycles that each evolves through different phases from generation to completion.

14. A computer system comprising:
   a software system landscape including a plurality of logical systems; and
   a central control system including
      a plurality of independent service software components to perform actions of a software maintenance process for servicing the logical systems, and
      a phase controller to
         determine a current phase of the software maintenance process, each phase of the software maintenance process defining actions allowed, required, or not allowed to be performed,
         receive a request generated by and received from an independent service software component of a plurality of independent service software components requesting allowance to perform an action,
         automatically and without human intervention, determining, using a customized algorithm stored at the phase controller for the independent service software component that describes actions to be taken, whether to allow the action based on the current phase of the software maintenance process and on phase definitions of the current phase comprising allowed or barred actions; and
         allow or deny the action based on the determining, the phase controller including a storage device for storing the customized algorithm for each of the independent service software components with the phase controller upon initial registration of each of the independent service software components with the phase controller, the customized algorithm used in the automatic determining of whether to allow or deny the action for the independent service software component.

15. The system of claim 14, wherein the phase definitions comprise one or more allowabilities for a generation of transport requests, for transporting of transport requests, for importing software services into logical systems, for test data generation, or for test message generation.

16. The system of claim 14, wherein the phase model comprises one or more of a generation phase, a cancellation phase, a development phase without approval, a development phase, a test phase, an urgent correction phase, a go-life phase, or a finalization phase.

17. The system of claim 14, wherein the phase controller is configured to initiate a change from one phase to another phase.

18. The system of claim 14, wherein the phase controller is logically connected to the service software components and configured to inquire at the service software components whether a change from one phase to another phase is possible.

19. The system of claim 14, wherein a service software component is configured to request a change from one phase to another phase at the phase controller.

20. The system of claim 14, wherein the phase controller is further configured to
   request all service software components indicate whether an intended change of phase is possible from a perspective of each service software component; and
   based on all service software components indicating change is possible, notify the service software components to proceed to a next phase.

21. A non-transitory computer program product comprising on a storage medium a computer code that upon execution on a computer system performs operations comprising:
   determining a current phase of a software maintenance process, each phase of the software maintenance process defining actions allowed, required, or not allowed to be performed;
   receiving a request generated by and received from an independent service software component of a plurality of independent service software components requesting allowance to perform of an action, the plurality of independent service software components to perform actions of the software maintenance process;
   storing a customized algorithm for each of the independent service software components at the phase controller upon initial registration of each of the independent service software components with the phase controller, the customized algorithm used in automatically determining whether an intended action is allowed by describing actions to be taken for each of the independent service software components;
   automatically and without human intervention, determining, using the phase controller and the customized algorithm stored at the phase controller for the independent service software component, whether to allow the action based on the current phase of the software maintenance process and on phase definitions of the current phase comprising allowed or barred actions; and
   allowing or denying the action based on the determining performed by the phase controller.

* * * * *